(12) United States Patent
Kurosawa et al.

(10) Patent No.: US 7,447,750 B2
(45) Date of Patent: Nov. 4, 2008

(54) PROGRAM SETTING SYSTEM, PROGRAM SETTING METHOD, SERVER, CLIENT AND PROGRAM

(75) Inventors: Ryuji Kurosawa, Kawasaki (JP); Kyoko Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 676 days.

(21) Appl. No.: 10/101,855

(22) Filed: Mar. 21, 2002

(65) Prior Publication Data

US 2003/0093502 A1 May 15, 2003

(30) Foreign Application Priority Data

Nov. 9, 2001 (JP) ............................. 2001-344417

(51) Int. Cl.
*G06F 15/177* (2006.01)
(52) U.S. Cl. ................... 709/220; 709/219; 709/203; 709/228; 709/229; 709/227; 709/221; 709/222; 705/16
(58) Field of Classification Search ................ 709/203, 709/219–223, 227–229; 705/16
See application file for complete search history.

(56) References Cited

U.S. PATENT DOCUMENTS

| 5,717,930 | A | 2/1998 | Imai |
| 6,360,137 | B1 * | 3/2002 | Royal et al. ................. 700/231 |
| 6,374,079 | B1 * | 4/2002 | Hsu ........................... 455/11.1 |
| 6,460,163 | B1 * | 10/2002 | Bowman et al. ............ 714/819 |
| 6,854,010 | B1 * | 2/2005 | Christian et al. ........... 709/223 |
| 6,877,093 | B1 * | 4/2005 | Desai et al. ................ 713/156 |

(Continued)

FOREIGN PATENT DOCUMENTS

JP 07-262117 10/1995

(Continued)

OTHER PUBLICATIONS

Notice of Reason for Rejection mailed Jan. 9, 2007 in corresponding Japanese Patent Application No. 2001-344417.

(Continued)

*Primary Examiner*—Nathan Flynn
*Assistant Examiner*—Mohammad Siddiqi
(74) *Attorney, Agent, or Firm*—Staas & Halsey LLP

(57) ABSTRACT

A system for performing a setting of a program downloaded from a server to a client is provided, which includes: a communication device performing data communications between the server and the client; and a storing device storing a predetermined program and a plurality of sets of setting information for the predetermined program, in which the server includes: a first receiver section receiving specifying information sent from the client via the communication device for specifying the setting information; and a first transmitter section reading out from the storing device the predetermined program and the setting information specified by the specifying information received from the client, and sending these to the client that is the origin of the specifying information via the communication device, and in which the client includes: a second transmitter section sending the specifying information to the server via the communication device; a second receiver section receiving the predetermined program and the setting information specified by the specifying information, which are sent from the server via the communication device; and a setting section performing a setting of the predetermined program received from the server based on the setting information received from the server.

4 Claims, 6 Drawing Sheets

U.S. PATENT DOCUMENTS

| | | | |
|---|---|---|---|
| 6,934,532 B2 * | 8/2005 | Coppinger et al. | 455/412.1 |
| 6,944,662 B2 * | 9/2005 | Devine et al. | 709/225 |
| 7,086,584 B2 * | 8/2006 | Stoutenburg et al. | 235/379 |
| 2001/0037245 A1 * | 11/2001 | Ranganath et al. | 705/16 |
| 2003/0005096 A1 * | 1/2003 | Paul et al. | 709/222 |
| 2003/0120546 A1 * | 6/2003 | Cusack et al. | 705/16 |
| 2003/0149662 A1 * | 8/2003 | Shore | 705/39 |

FOREIGN PATENT DOCUMENTS

| | | |
|---|---|---|
| JP | 08-087460 | 4/1996 |
| JP | 09-218777 | 8/1997 |
| JP | 10-198569 | 7/1998 |
| JP | 10-301760 | 11/1998 |
| JP | 11-161604 | 6/1999 |
| JP | 11-212793 | 8/1999 |
| JP | 11-269351 | 10/1999 |
| JP | 2000-111488 | 4/2000 |
| JP | 2000-276332 | 10/2000 |
| JP | 2001-309099 | 11/2001 |

OTHER PUBLICATIONS

Notice of Reason for Rejection mailed Oct. 3, 2006 in corresponding Japanese Patent Application No. 2001-344417.

Final Decision of Rejection issued in corresponding Japanese Patent Application No. 2001-344417 mailed Apr. 3, 2007.

* cited by examiner

FIG. 5
EX 1) POS INSTALLATION INFORMATION
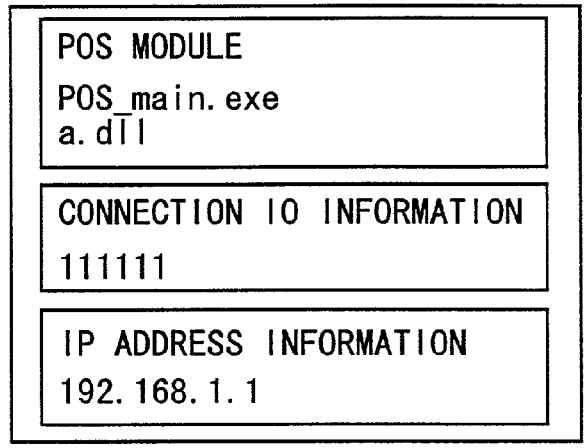
EX 2) PAD INSTALLATION INFORMATION
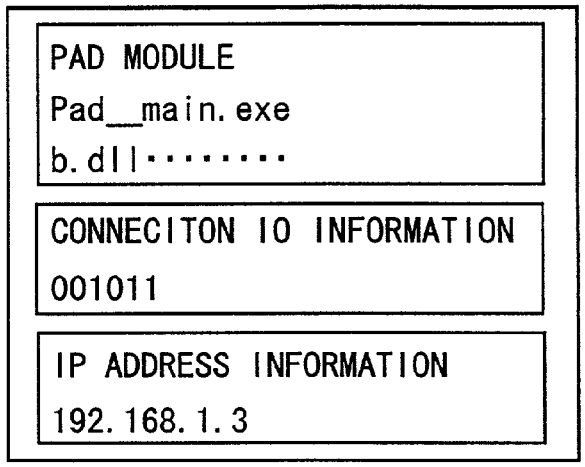
EX 3) WS INSTALLATION INFORMATION
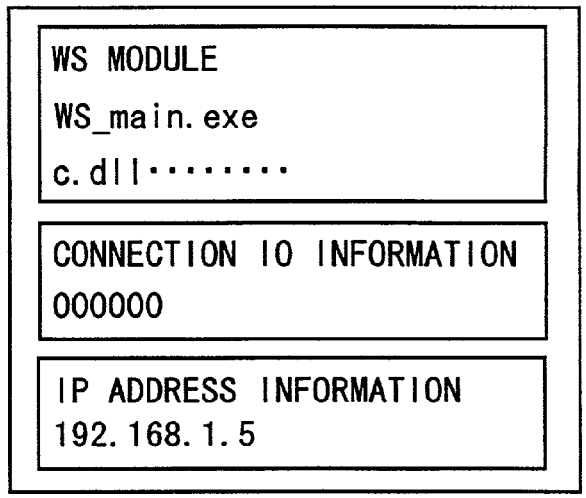

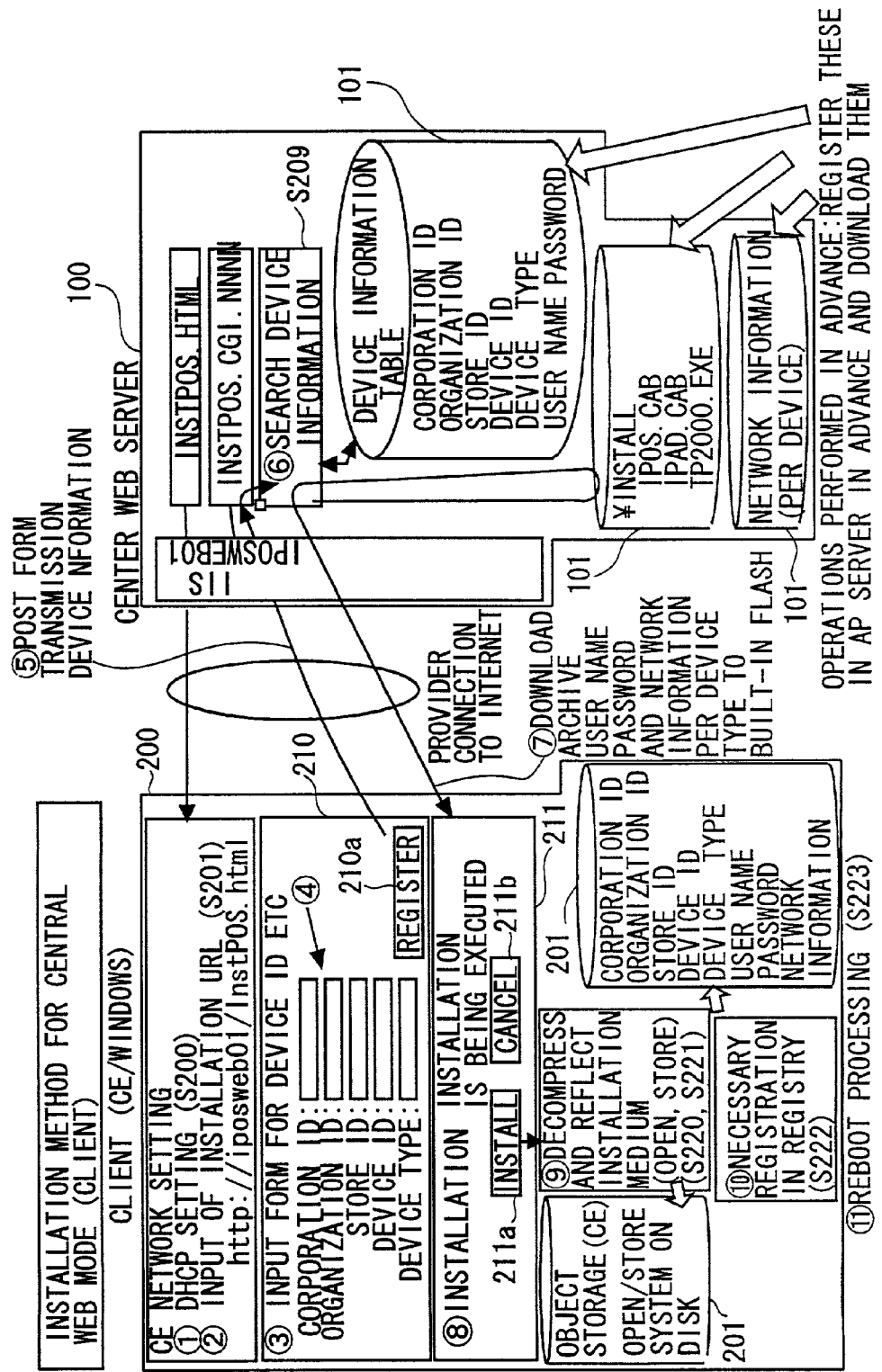

PROGRAM SETTING SYSTEM, PROGRAM SETTING METHOD, SERVER, CLIENT AND PROGRAM

BACKGROUND OF THE INVENTION

1. Field of the Invention

The present invention relates to a system for performing a setting of a program downloaded to a client from a server, a method for the same, and a server, a client and a program which are encompassed by the system.

2. Description of the Related Art

Up to now, when a program was to be installed on a client, an installation program was downloaded from a CD-ROM reading device or other such local device, a file server or the like, and after that, information (such as a connecting device and a device name) for an individual device was set. Accordingly, as there were more devices, the number of operational arrangements to be made for each device increased. Further, for a device that does not have normal keyboard and display, as in a particular industry-type terminal, time and labor was required to attach a separate keyboard to perform the setting. Further, in the case where a plurality of devices (having different hardware and operating systems) existed, it was necessary to perform installation by means of different installers.

SUMMARY OF THE INVENTION

The present invention has an object of enabling an automatic setting of a program that is downloaded from a server to a client, thereby eliminating a need for a user to perform the setting of the program.

According to the present invention, there is provided a system for performing a setting of a program downloaded from a server to a client, including: a communication device performing data communications between the server and the client; and a storing device storing a predetermined program and a plurality of sets of setting information for the predetermined program, in which the server includes: a first receiver section receiving specifying information sent from the client via the communication device for specifying the setting information; and a first transmitter section reading out from the storing device the predetermined program and the setting information that was specified by the specifying information received from the client, and sending these to the client that is the origin of the specifying information via the communication device, and in which the client includes: a second transmitter section sending the specifying information to the server via the communication device; a second receiver section receiving the predetermined program and the setting information specified by the specifying information, which are sent from the server via the communication device; and a setting section performing a setting of the predetermined program received from the server based on the setting information received from the server.

In accordance with the present invention, the client can automatically perform the setting of the program downloaded from the server to the client by means of the setting section. Therefore, it is not necessary for a user to perform the setting of the program.

In the above-mentioned program setting system, for example, the plurality of sets of setting information are stored while being made to correspond with client identification information for identifying the client; the second transmitter section sends, as the specifying information, the client identification information for identifying its client; and the first transmitter section reads out from the storing device the setting information corresponding to the client identification information received from the client as the setting information specified by the specifying information received from the client.

According to this arrangement, the client, by means of its setting section, can perform the setting of the program (the program downloaded to the server) based on the setting information that corresponds to its own client identification information. In other words, the setting appropriate for the client's own environment (peripheral devices connected to the client, for example) becomes possible.

In the above-mentioned program setting system, for example, the predetermined program is composed of a main module and a plurality of sub-modules; the setting information contains designating information for designating, from among the plurality of sub-modules, the sub-module that should be set to be executable on the client that is the origin of the specifying information; the first transmitter section reads out from the storing device the main module and the plurality of sub-modules as the predetermined program; and the setting section performs the setting such that, from among the plurality of sub-modules received as the predetermined program from the server, the sub-module designated by the designating information is useable.

This enables the setting to be performed for only the sub-module that is necessary at the client.

In the above-mentioned program setting system, for example, the predetermined program is composed of a main module and a plurality of sub-modules; the setting information contains designating information for designating, from among the plurality of sub-modules, the sub-module that should be set to be executable on the client that is the origin of the specifying information; and the first transmitter section reads out from the storing device the main module and the sub-program designated by the designating information as the predetermined program.

According to this arrangement, since only the sub-module that is designated by the designating information and necessary at on the client is downloaded, a download volume may be decreased.

In the above-mentioned program setting system, for example, the setting information includes at least one of connection IO information, an IP (INTERNET PROTOCOL) address, a user ID (IDENTIFIER) and a password.

Further, according to the present invention, in order to achieve the above-mentioned object, there is provided a method for performing a setting of a program downloaded from a server to a client, in which: the server receives specifying information sent from the client for specifying setting information, reads out a predetermined program and setting information specified by the specifying information received from the client from a storing device storing the predetermined program and a plurality of sets of setting information for the predetermined program, and sends these to the client that is the origin of the specifying information; and the client receives the predetermined program and the setting information specified by the specifying information which are sent from the server, and performs a setting of the predetermined program received from the server based on the setting information received from the server.

In accordance with the present invention, the client may automatically perform the setting of the program downloaded from the server to the client. Therefore, it is not necessary for a user to perform the setting of the program.

In the above-mentioned program setting method, for example, the plurality of sets of setting information are stored while being made to correspond with client identification information for identifying a client; the client sends, as the specifying information, the client identification information for identifying its client; and the server reads out from the storing device the setting information corresponding to the client identification information received from the client, as the setting information specified by the specifying information received from the client.

This arrangement enables the client to perform the setting of the program (the program downloaded from the server) based on the setting information that corresponds to the client's own client identification information. In other words, the setting appropriate for the client's own environment (peripheral devices connected to the client, for example) becomes possible.

In the above-mentioned program setting method, for example, the predetermined program is composed of a main module and a plurality of sub-modules; the setting information contains designating information for designating, from among the plurality of sub-modules, the sub-module that should be set to be executable on the client that is the origin of the specifying information; the server reads out from the storing device the main module and the plurality of sub-modules as the predetermined program; and the client performs the setting such that, from among the plurality of sub-modules received as the predetermined program, the sub-module designated by the designating information from the server is useable.

This enables the setting to be performed only for the sub-module that is necessary at the client.

In the above-mentioned program setting method, for example, the predetermined program is composed of a main module and a plurality of sub-modules; the setting information contains designating information for designating, from among the plurality of sub-modules, the sub-module that should be set to be executable on the client that is the origin of the specifying information; and the server reads out from the storing device the main module and the sub-module designated by the designating information, as the predetermined program.

According to this arrangement, since only the sub-module that is designated by the designating information and necessary at the client is downloaded, a download volume may be decreased.

In the above-mentioned program setting method, for example, the setting information includes at least one of connection IO information, an IP address, a user ID and a password.

Further, according to the present invention, there is provided a server for holding a program that is downloaded to a client, the server including: a receiver section receiving specifying information sent from the client for specifying setting information; and a transmitter section reading out a predetermined program and setting information specified by the specifying information received from the client from the storing device storing the predetermined program and a plurality of sets of setting information for the predetermined program, and sending these to the client that is the origin of the specifying information.

In the above-mentioned server, for example, the plurality of sets of setting information are stored while being made to correspond with the client identification information for identifying the client; the receiver section receives, as the specifying information, the client identification information for identifying the client; and the transmitter section reads out from the storing device the setting information corresponding to the client identification information received from the client, as setting information specified by the specifying information received from the client.

In the above-mentioned server, for example, the predetermined program is composed of a main module and a plurality of sub-modules; the setting information contains designating information for designating, from among the plurality of sub-modules, the sub-module that should be set to be executable on the client that is the origin of the specifying information; and the transmitter section reads out from the storing device the main module and the sub-module designated by the designating information as the predetermined program.

In the above-mentioned server, for example, the setting information includes at least one of connection IO information, an IP address, a user ID and a password.

The above-mentioned server may be specified as follows: a program for causing a computer to execute the procedure of: receiving specifying information sent from a client for specifying setting information; reading out a predetermined program and the setting information specified by the specifying information received from the client from a storing device storing the predetermined program and a plurality of sets of setting information for the predetermined program; and sending these to the client that is the origin of the specifying information.

Further, according to the present invention, there is provided a client for downloading a program from a server, including: a transmitter section sending to the server specifying information for specifying setting information; a receiver section receiving a predetermined program and the setting information specified by the specifying information from among a plurality of sets of the setting information, which are sent from the server; and a setting section performing a setting of the predetermined program received from the server based on the setting information received from the server.

In the above-mentioned client, for example, the plurality of sets of setting information are stored while being made to correspond with client identification information for identifying the client; the transmitter section sends, as the specifying information, the client identification information for identifying its client; and the receiver section receives from the server the setting information which corresponds to the client identification information from among the plurality of sets of setting information, as the setting information specified by the specifying information from among the plurality of sets of setting information.

In the above-mentioned client, for example, the predetermined program is composed of a main module and a plurality of sub-modules; the setting information received by the receiver section includes designating information for designating, from among the plurality of the sub-modules, the sub-module which should be set to be executable; and the setting section performs the setting such that, from among the plurality of sub-modules received as the predetermined program from the server, the sub-module designated by the designating information is useable.

In the above-mentioned client, for example, the setting information received by the receiver section includes at least one of connection IO information, an IP address, a user ID and a password.

The client may be specified as follows: a program for causing a computer to execute the procedure of: sending specifying information for specifying setting information to a server; receiving a predetermined program and the setting information specified by the specifying information from among a plurality of sets of setting information, which are sent from the server; and performing a setting of the predetermined program received from the server based on the setting information received from the server.

Further, according to the present invention, there is provided a system for performing a setting of a program downloaded from a server to a client, including: a communication device performing data communications between the server and the client; and a storing device storing a plurality of predetermined programs and a plurality of sets of setting information for the predetermined programs, in which the server includes: a first receiver section receiving specifying information sent from the client via the communication device for specifying the predetermined program and the setting information; and a first transmitter section reading out, from the storing device, the predetermined program and the setting information which are specified by the specifying information received from the client, and sending these to the client that is the origin of the specifying information via the communication device, and in which the client includes: a second transmitter section sending the specifying information to the server via the communication device; a second receiver section receiving the predetermined program specified by the specifying information and the setting information specified by the specifying information, which are sent from the server via the communication device; and a setting section performing a setting of the predetermined program received from the server based on the setting information received from the server.

According to the present invention, client can automatically perform the setting of the program downloaded to the client from the server by means of its setting section. Therefore, it is not necessary for a user to perform the setting of the program.

BRIEF DESCRIPTION OF THE DRAWINGS

In the accompanying drawings:

FIG. 5 shows an example of a predetermined program and setting information sent to a client; and FIG. 6 is a diagram showing an outline system configuration of a variation of the POS system according to the embodiment of the automatic program setting system of the present invention.

DETAILED DESCRIPTION OF THE PREFERRED EMBODIMENTS

Figure 1:
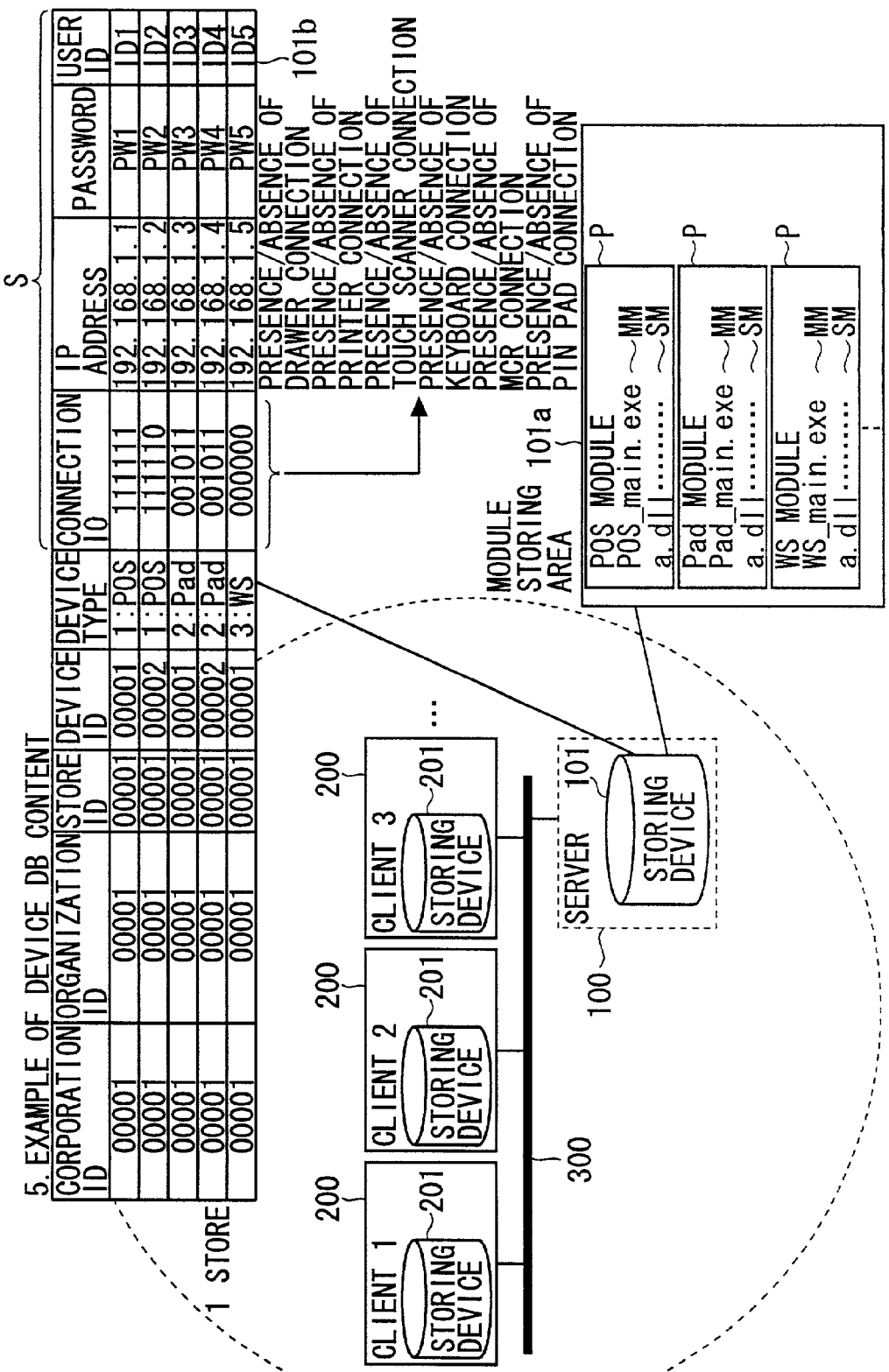
FIG. 1 is a diagram showing an outline system configuration of a POS system in accordance with an embodiment of an automatic program setting system of the present invention.
Figure 4:
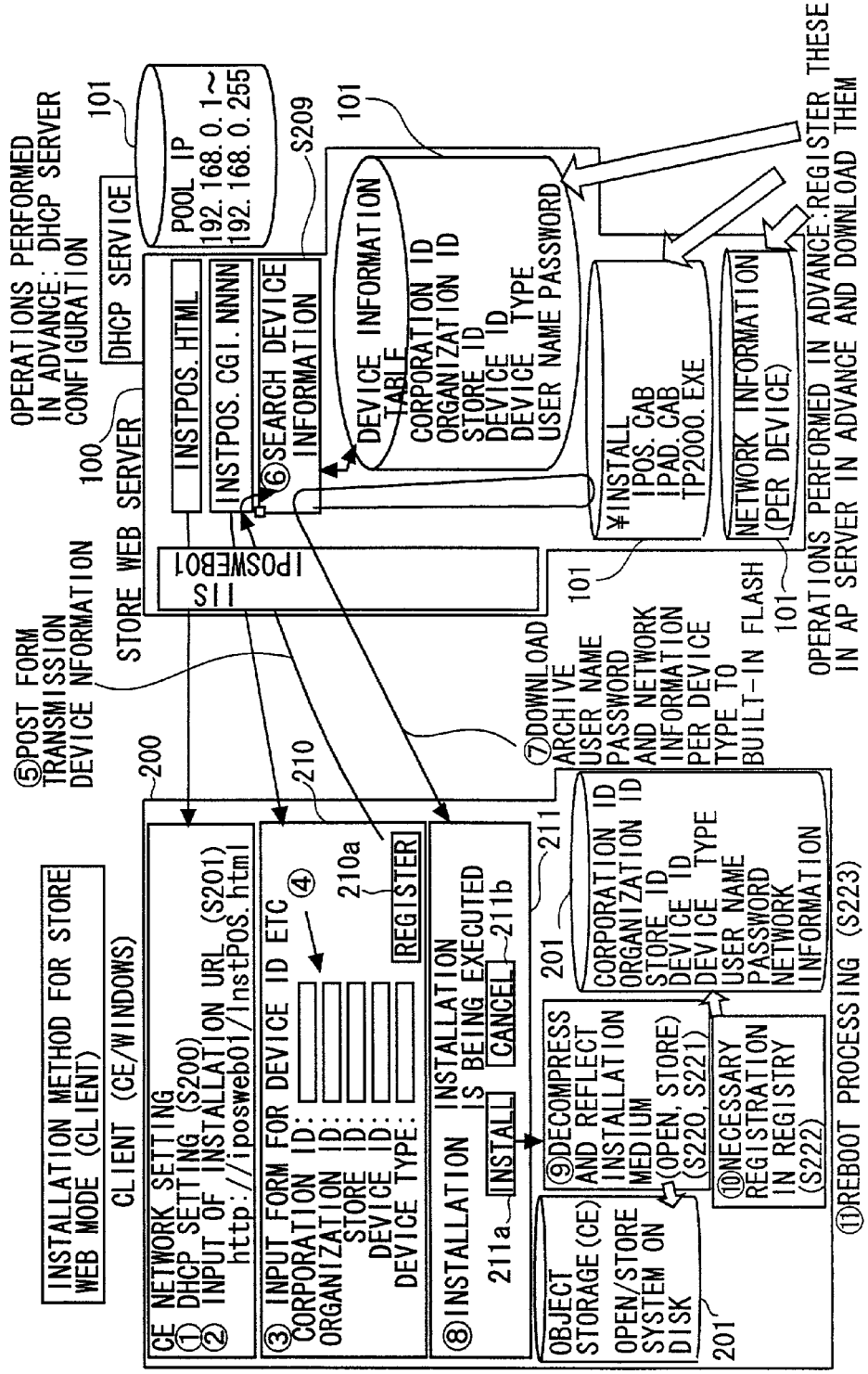
FIG. 4 is a diagram showing an outline system configuration of a POS system according to an embodiment of an automatic program setting system of the present invention.

Hereinafter, explanation will be made of an example in which an automatic program setting system according to the present invention is applied to a POS (POINT OF SALE) system, making reference to the drawings. FIG. 1 and FIG. 4 are diagrams for explaining an outline system configuration of the POS system.

The POS system has a LAN (Local Area Network) 300 laid out in a particular store belonging to a particular organization of a particular corporation, a server (a store Web server) 100, and a plurality of clients (portable information input terminal devices) 200. The server 100 and the plurality of clients 200 are connected to the LAN 300 by a cable or wirelessly. The server 100 and the plurality of clients 200 each have communications equipment (not shown) such as a LAN card, and both can perform data communications with each other via the LAN 300. The LAN 300 and the LAN card or other such communications equipment are appropriate as the communication devices for carrying out the data communications between the server 100 and the clients 200.

The server 100 is a relatively high performance computer such as a workstation. The server 100 is equipped with a central processing unit (CPU) and a processing unit such as a storing device 101 such as a hard disk device. The server 100 also may have peripheral devices such as input sections such as a keyboard and a mouse, and an image display device such as a CRT display or a liquid crystal display.

The server 100 also has a receiver section and a transmission section. The receiver section receives specifying information (client identification information) which specifies setting information and is sent from the clients 200 via the communication device. The transmitter section reads, from a storing device 101 (database), a predetermined program P and setting information S (setting information S that was linked to the client identification information) which is specified by the specifying information (client identification information) that has been received from the clients 200. Then, the transmitter section sends the predetermined program P and the setting information S which it has read out, to the clients 200 that are the origin of the specifying information (client identification information) via its communication device. The receiver section and the transmitter section are mainly realized by execution of a program stored in the storing device 101.

An operating system such as Windows, Mac OS or UNIX is installed in the storing device 101. The storing device 101 there is also installed with a program that is to be executed on the operating system for functioning as a WWW (World Wide Web) server, a program for functioning as a DHCP (Dynamic Host Configuration Protocol) server, and the like.

In the storing device 101 there is also stored a plurality of predetermined programs P and a plurality of sets of setting information S for these predetermined programs P. The predetermined programs P are programs that are executable on the clients 200, and are each composed of a main module MM and a plurality of sub-modules (or a single sub-module) SM. Each predetermined program P is corresponded with a device type indicating types of the clients 200 (categorization as a POS terminal, a Pad, a WS and the like), and is stored in a module storing area 101a in the storing device 101.

Accordingly, a specific device type serves as a key, and a predetermined program P (namely, the main module MM and the plurality of sub-modules SM) corresponding to the device type may be read out from the storing device 101 (module storing area 101a).

Examples of the main module may include a POS module for realizing a POS (Point of Sale) function, a Pad module for realizing a Pad function, a WS (workstation) module for realizing a variety of functions such as reference of sales data, and the like.

Examples of the sub-module may include modules for controlling peripheral devices connected to the clients 200 such as a cash drawer control module, a printer control module, a touch scanner control module, a keyboard control module, an MCR (magnetic card reader) control module, and a PIN pad control module.

The setting information S includes a connection IO, an IP address, a password, a user ID and the like. The setting information S is linked to the client identification information (a corporation ID, an organization ID, a store ID, a device ID and a device type) for identifying the client, as shown in the chart on the top-right of FIG. 1, and the setting information S is registered in a device information database 101b established in the storing device 101. Accordingly, specific client identification information serves as a key, and the setting information S corresponding to the client identification information in question may be read out from the storing device 101 (the device information database 101b).

The connection IO included in the setting information S is designating information for designating the sub-module(s) that should be set so as to be executable on the client 200 from among the plurality of sub-modules configuring the predetermined program P. The connection IO is a bit array of a predetermined number of bits, and the sub-module(s) which should be set to be executable on the client 200 are designated by the bit positions.

For example, in the case where the connection IO is "111111", the sub-modules that are being designated for setting to be executable on the client 200 are all the sub-modules: the cash drawer control module, the printer control module, the touch scanner control module, the keyboard control module, the MCR control module, and the PIN pad control module.

Further, in the case where the connection IO is "001011", the sub-modules that are being designated for setting to be executable on the client 200 are the touch scanner control module, the MCR control module and the PIN pad control module.

The clients 200 are business information terminals such as a POS terminal, a Pad and a WS. The clients 200 each have a central processing unit (CPU), a storing device 201 such as a hard disk drive or a non-volatile memory card (such as compact flash), an input section such as a keyboard, a mouse or a touch, an image display device such as a CRT display or a liquid crystal display, and the like.

Client identification information (a corporation ID, an organization ID, a store ID and a device ID) is allotted to each client 200. The client identification information may further include a device type. Connected to each client 200 is equipment (such as the cash drawer, the printer, the touch scanner, the keyboard, the MCR and the PIN pad) (none are shown) which correspond to the bit positions in the connection IO that links the client identification information of that client.

An operating system such as Windows, Mac OS or UNIX is installed in each storing device 201. Each storing device 201 there is also installed with a browser to be executed on the operating system. In each storing device 201 there is also provided a registry for registering a variety of hardware and software settings, environment settings for each user, and the like. The registry is composed of a database and a file, for example.

Each client 200 also has a transmitter section, a receiver section and a setting section. The transmitter section sends the specifying information (the client identification information for identifying the client 200) for specifying the setting information to the server 100 via the communication device. The receiver section receives the predetermined program (the main module and the plurality of sub-modules) and the setting information S (the setting information S linked to the client identification information for that client) specified by the specifying information (the client identification information), which were sent from the server 100 via the communication device. The setting section performs a setting of the predetermined program received from the server 100, based on the setting information S received form the server 100. The transmitter section, the receiver section and the setting section are mainly realized by execution of a program stored in the storing device 201 of each client 200.

Figure 2:
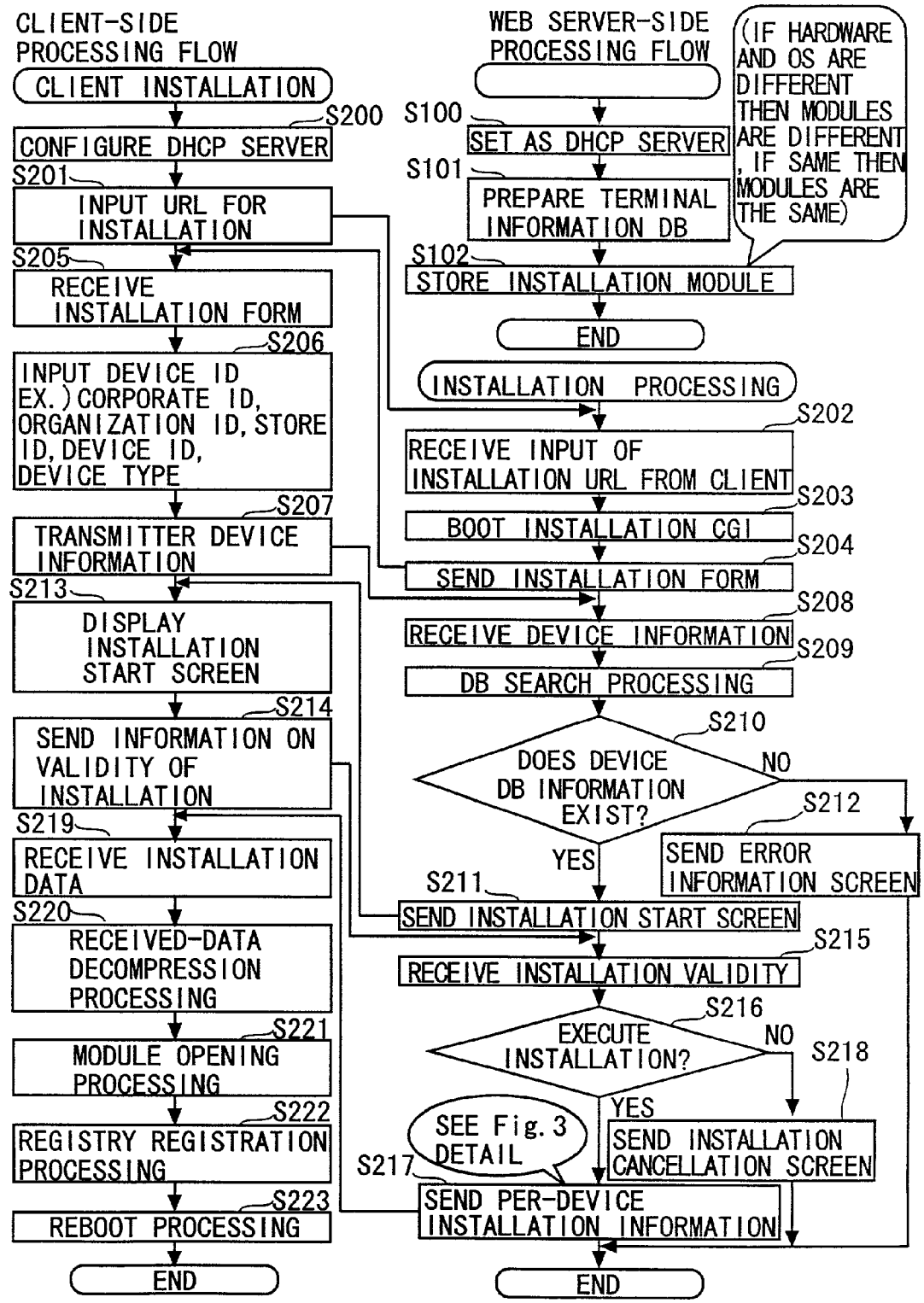
FIG. 2 is a flow chart for explaining an operation of the POS system according to the embodiment of the automatic program setting system of the present invention.

Next, an operation of the POS system having the above-mentioned configuration is explained with reference to the drawings. FIG. 2 is a flow chart for explaining the operation of the POS system.

First, in order for the server 100 to function as a DHCP server as well, an IP address (a pool IP) and the like actively distributed to the client 200 are registered (S100). Then, necessary items (such as the client identification information and the setting information) are registered in the device information database 101b (S101). Further, the predetermined program (namely, the main module MM and the plurality of sub-modules SM) are stored in the module storing area 101a (S102).

In the case where the system is originally introduced or expanded, or a broken client is replaced, when a new client is to be connected to the LAN 300 laid out in a specific store, the user on the client side performs the following.

First, the client 200 (the browser and the like) is set so as to receive the IP address distribution from the DHCP server (S200). The IP address, which is distributed from the DHCP server to the client 200, is used, for example, when the predetermined program and the setting information for the predetermined program are to be downloaded from the server 100 to the client 200. Thus, when the predetermined program is to be downloaded from the server 100, only the smallest necessary amount of network information is set in the client 200.

When the browser of a specific one of the clients 200 is started and a predetermined URL (Uniform Resource Locator) is inputted via the browser (S201, S202), the server 100 starts an installer system (for example, a CGI [Common Gateway Interface]) (S203), reads predetermined data from the storing device 101 and the like, and generates an installation form (HTML). The server 100 sends the generated install form to the client 200 (the browser) (S204).

Note that a configuration is also possible in which a different URL for each type of client is inputted into the browser, and the server 100 generates the install form in response to the type of the client 200 and sends it to the client 200 (the browser).

The client 200 (the browser) receives the install form (HTML) from the server 100 (S205) and displays an input FORM 210 based on the received install form (see FIG. 4). The input FORM 210 is composed of input boxes for inputting the specifying information (the corporation ID, the organization ID, the store ID, the device ID and the device type, which are the client's own client identification information) for specifying the setting information.

The specifying information (the client's own client identification information) for specifying the setting information is inputted via the keyboard or other such input section (S206), and when a "register" button 210a on the same screen is clicked, the client 200 sends the inputted specifying information (the corporation ID, the organization ID, the store ID, the device ID and the device type, which are the client's own client identification information) to the server 100 via the communication device by means of its transmitter section (S207)

The server 100 receives the specifying information (the client's own client identification information) for specifying the setting information, from the client 200 by means of the receiver section (S208). Then, the transmitter section of the server 100 searches the storing device 101 (the device information database 101b) for the setting information S (the setting information S corresponding to the client's own client identification information) specified by the specifying information (the client's own client identification information) received from the client 200 (S209).

If the corresponding setting information S is retrieved (that is, if it is confirmed that the corresponding setting information S is registered in the device information database 101b) (S210: Yes), then the server 100 sends an installation start screen (HTML) to the client 200 (S211). On the other hand, if the corresponding setting information is not retrieved (S212: No), then the server 100 sends an error information screen (HTML) to the client 200 to notify the client of this (S212).

The client 200 displays an installation start screen 211 based on the installation start screen (HTML) received from the server 100 (see FIG. 4) (S213). When an "execute" button 211a or a "cancel" button 211b on the same screen is clicked (S214), the server 100 receives content of the click (S215) and performs processing in response to the click content.

That is, in the case where the server 100 determines that the "execute" button 211a was clicked (S216: Yes), the transmitter section reads out from the storing device 101 (the device information database 101b) the predetermined program P (the main module MM and the plurality of sub-modules SM) that is corresponded with the device type in the specifying information received from the client 200, and the setting information S (such as the setting information S, the connection IO, the IP address, the password and the user ID which are corresponded to the client identification information of that client) that is specified by the specifying information received from the client 200. The transmitter section then compresses and sends these to the client 200 that is the origin of the specifying information (the client identification information), via the communication device (S217). Note that, in the case where the predetermined program P is compressed in advance, the compression processing is omitted.

Note that, there are cases where the device type is not inputted at the client 200 and only the corporation ID, the organization ID, the store ID and the device ID are inputted as the specifying information (client's own client identification information) for specifying the setting information (S206). In this case, the server 100 first searches the storing device 101 (the device information database 101b) for the device type that corresponds to the specifying information (the client's own client identification information). Thereafter, the server 100 uses the searched device type to perform the processing explained at S217 above.

Figure 3:
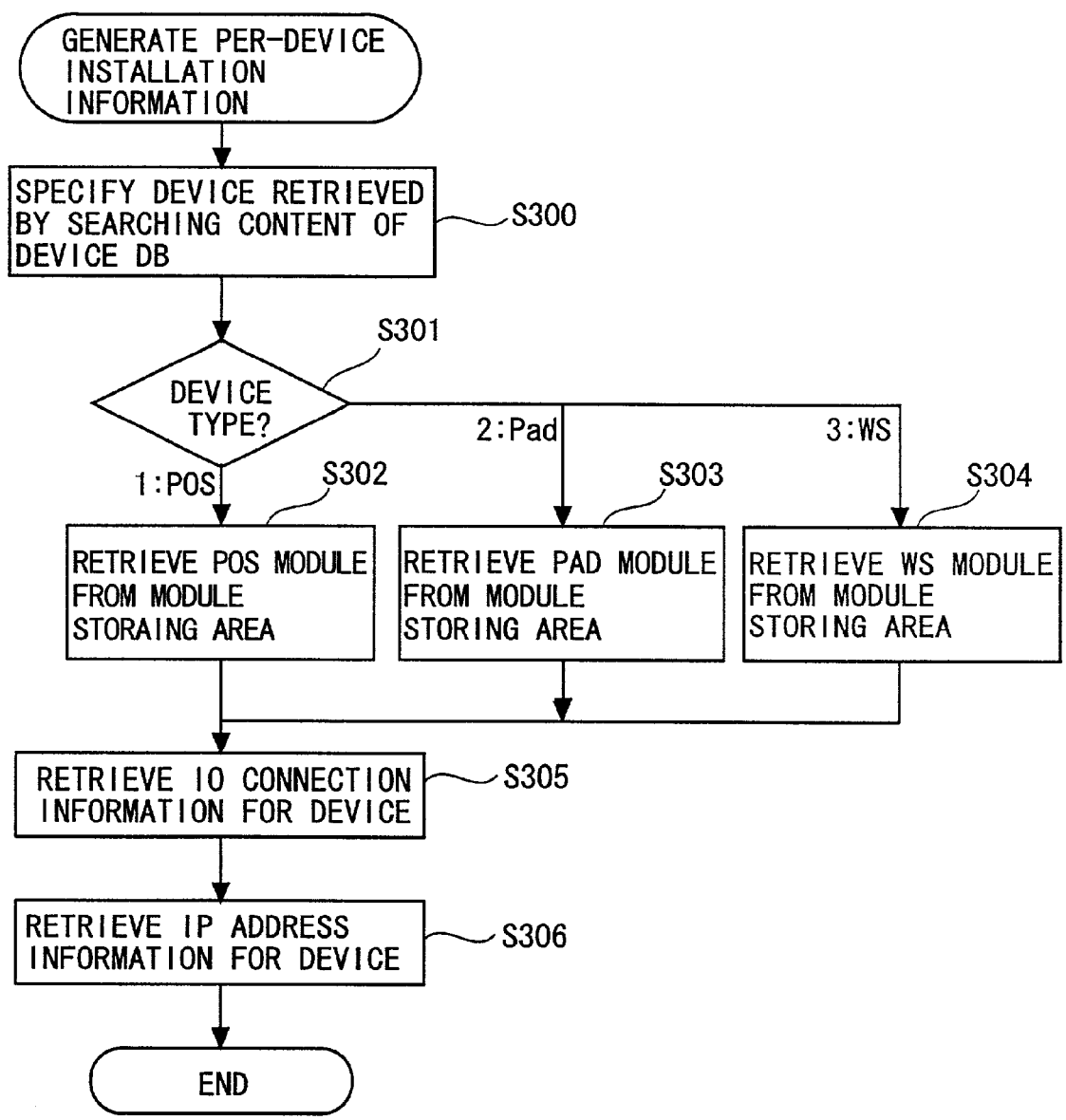
FIG. 3 is a flow chart for explaining an operation of a POS system according to the embodiment of the automatic program setting system of the present invention.

The processing performed by the transmitter section (the processing of S217) is explained in detail making reference to FIG. 3.

It is assumed, for example, that at the client 200 the specifying information (the client's own client identification information) for specifying the setting information which is inputted is: corporation ID="00001", organization ID="00001", store ID="0001", device="0002" and device type="POS" (S206).

In this case, the server 100 receives these input data as the specifying information (the client identification information of that client) for specifying the setting information from the client 200 (S208). Then, the transmitter section of the server 100 reads, from the storing device 101 (the device information database 101b), the predetermined program (a POS module and a plurality of sub-modules) corresponding to the device type of "POS" in the specifying information (the client's own client identification information) received from the client 200 (S301 to S304).

Further, from the storing device 101 (the device information database 101b) the server 100 reads out the setting information S (i.e., connection IO="111110", IP address="192.168.1.2", password="PW2" and user ID="ID2", corresponding to the client identification information of that client) specified by the specifying information (the client's own client identification information) received from the client 200, and compresses and sends the setting information S to the client 200 that was the origin of the specifying information(the client identification information), via the communication device (S305, S306).

Note that, as another example, it is assumed that the device type="POS" is not inputted at the client 200 and the specifying information (the client's own client identification information) that is inputted is: "corporation ID="00001", organization ID="00001", store ID="0001" and device ID="0002" only (S206).

In this case, the server 100 receives these input data as the specifying information (the client identification information of that client) for specifying the setting information from the client 200 (S208) Then, the server 100 first searches the storing device 101 (the device information database 101b) for the device type of "POS" that is corresponded to the specifying information (the client's own client identification information) received from the client 200 (S300). Then, the server 100 reads out from the storing device 101 (the device information database 101b) the predetermined program P (the POS module and the plurality of sub-modules) that corresponds to the retrieved device type of "POS" (S301 to S304). Further, the server 100 reads out from the storing device 101 (the device information database 101b) the setting information S (connection IO="111110", IP address="192.168.1.2", password="PW2" and user ID="ID2", corresponding to the client identification information of that client) that is specified by the specifying information (the client's own client identification information) received from the client 200, and compresses and sends the setting information S to the client 200 that is the origin of the specifying information (the client identification information), via the communication device (S305, S306). FIG. 5 shows an example of the predetermined program P (the main module MM and the plurality of sub-modules SM) and the setting information S which are sent to the client 200.

On the other hand, in the case where the server 100 determined that the "cancel" button 211b was clicked at the client 200 (S216: No), the server 100 sends an installation cancellation screen (HTML) to the client 200 (S218).

The client 200 receives from the server 100 the predetermined program P (the POS module and the plurality of sub-modules in the above-mentioned example) and the setting information S (connection IO="111110", IP address="192.168.1.2", password="PW2" and user ID="ID2" in the above-mentioned example) (S219), and decompresses the received data (S220).

The client 200 also performs module opening processing on the predetermined program P which it received from the server 100 (S221). Further, the setting section of the client 200 performs registration processing in a registry based on the setting information S received from the server 100 (S222), and executes rebooting (S223) and the like, thereby executing the setting of the predetermined program received (downloaded) from the server 100.

Specifically, predetermined data is registered into the registry and the like such that, from among the plurality of sub-modules which have been opened, the sub-module that is designated by the connection IO bit positions becomes executable. Accordingly, it is not necessary for the user him/ herself to perform manually the setting at the client 200 so as to make the sub-module executable.

Further, the IP address, the password and the user ID are also registered into the registry and the like. Accordingly, it is not necessary for the user him/herself to manually set this information at the client 200. Thereafter, the client 200 may perform communications with a variety of servers and the like based on the set IP address, and it is not necessary to receive the distribution of the IP address from the DHCP server.

In accordance with the above-mentioned embodiment, an example was explained using the corporation ID, the organization ID, the store ID, the device ID and the device type as the specifying information (the client's own client identification information) for specifying the setting information. The specifying information (the client's own client identification information) for specifying the setting information is not limited to this, and it is possible to use, for example, a MAC address recorded in the LAN card or such connected to the client 200 or other such unique identification information assigned to the client 200. In this case, it is not necessary for the user to input the specifying information (the client identification information of that client) for specifying the setting information. Further, it is also possible to have the user input unique identification information into the client 200 through the input section or the like as the specifying information (the client's own client identification information) for specifying the setting information, and then store this unique identification information in the storing device 201 and use it.

In accordance with the above-mentioned embodiment, an example was explained in which the predetermined program P sent form the server 100 to the client 200 is composed of the main module MM and the plurality of sub-modules SM. The predetermined program P sent from the server 100 to the client 200 is not restricted to this construction, and may also be composed of the main module MM and only the sub-module SM designated by the connection IO bit positions among from the plurality of sub-modules SM, for example. In this case, the number of sub-modules (the data volume) sent to the client 200 may be decreased.

Further, the predetermined program P sent from the server 100 to the client 200 may also be comprised of a single program. In this case, at the client 200 it is possible to automatically set the IP address, the password and the user ID.

In accordance with the above-mentioned embodiment, an example was explained in which the device information database 101b is built in the storing device 101. The present invention is not restricted to this, and the device information database 101b may also be built on another storing device. For example, the device information database 101b may also be constructed in a storing device managed through a database server connected to the LAN 300. In this case, the server 100 is connected with the database server, whereby it receives necessary setting information from the other storing device and sends the information to the client 200. Similarly, the module storing area 101a may also be provided in the other storing device.

In accordance with the above-mentioned embodiment, an example was explained in which the predetermined program and the setting information are downloaded to the client 200 from the server 100 by means of the IP address distributed to the client 200 from the DHCP server. The present invention is not limited to this, and the predetermined program and the setting information may also be downloaded to the client 200 from the server 100 by means of an IP address which has been set temporarily by manual input. A system configuration diagram for this is shown in FIG. 6.

In accordance with the above-mentioned embodiment, explanation was made of an example in which the predetermined program and the setting information are downloaded to the client 200 from the server 100 which is connected to the same LAN 300 as that connected with the client 200. The present invention is not limited to this, and the predetermined program and the setting information may also be downloaded to the client 200 from a server which is connected to a different LAN from the LAN 300 to which the client 200 is connected. In this case, the present invention is realized by building a network such that the client may be connected to the server via a communications line (the Internet, a public telephone line, an ISDN line, or a dedicated line).

In accordance with the above-mentioned embodiment, explanation was made of an example in which the present invention is applied to a POS system. The present invention is not limited to this, and may also be applied to a variety of systems having a server-client relationship. For example, the present invention may also be applied to an accounting system composed of an accounting server and a client thereof, a software provision system composed of a vendor server of a shareware and freeware and a client thereof, and the like.

In accordance with the above-mentioned embodiment, explanation was made of an example in which the client 200 is connected in a fixed fashion to the LAN 300. The present invention is not restricted to this, and the client 200 may also be connected to the LAN 300 only when it is necessary to install the predetermined program in the client 200. In other words, it may be adopted such that: the client 200 is connected to the LAN 300; the necessary predetermined program and setting information are downloaded from the server 100; and after the completion of the setting for the downloaded program, the client 200 is disconnected from the LAN 300 and is used as a standalone or by being connected to another network.

As explained above, according to the present invention, the setting of the program downloaded from the server to the client is performed automatically, whereby it is possible to eliminate the need for the user to perform the setting of the program. That is, everything, including the setting information which has been conventionally set at an individual client, is turned into data, whereby setting processing on the client side may be kept at a minimum. Further, reduction of human error at the time of setup, reduction of setup time and the like, enable the client to be introduced and operated for a short time. Accordingly, a special program for the client side is not required.

The present invention can be implemented in various forms without deviating from the spirit and the main characteristics of the present invention. Therefore, the above-mentioned embodiments are just examples, and do not limit the scope of the present invention.

What is claimed is:

1. A system for performing a setting of a program downloaded from a server having a processor and a memory to a client having a processor and a memory, comprising:

a communication device performing data communications between the server and the client; and a storing device storing a predetermined program including a main module, a plurality of sub-modules each corresponding to peripheral devices connected to the client and a plurality of sets of setting information making the predetermined program executable on the client, including client setting information regarding an operating environment of the client having at least one of an IP address, a user ID and a password and including designating information designating, from the plurality of sub-modules, the sub-module that is set to be executable on the client that is an origin of specifying information for specifying the setting information by using a bit array of a predetermined number of bits each corresponding to the peripheral devices, wherein the server comprises:

a first receiver section sending, to the client, a data entry screen for entering the specifying information for specifying the setting information on the client, and receiving the specifying information that is entered through the data entry screen and is sent from the client via the communication device; and a first transmitter section reading out, from the storing device, the main module, the sub-module designated by bit positions of the designating information and the setting information specified by the specifying information received from the client, and sending these to the client that is the origin of the specifying information via the communication device, and wherein the client comprises:

a second transmitter section sending, to the server, the specifying information that is entered through the data entry screen sent from the server via the communication device;

a second receiver section receiving the main module, the sub-module and the setting information specified by the specifying information, that are sent from the server via the communication device; and a setting section performing environment settings of the client itself to make the main module and the sub-module respectively received from the server executable based on the setting information received from the server and reflecting the client setting information included in the setting information received from the server in the environment settings of the client itself.

2. A program setting system according to claim 1, wherein:

the plurality of sets of setting information are stored while being made to correspond with client identification information for identifying a client;

the second transmitter section sends, as the specifying information, the client identification information for identifying its client; and the first transmitter section reads out from the storing device the setting information corresponding to the client identification information received from the client as the setting information specified by the specifying information received from the client.

3. A method for performing a setting of a program downloaded from a server having a processor and a memory to a client having a processor and a memory, comprising:

by the server, sending, to the client, a data entry screen for entering specifying information for specifying the setting information on the client and receiving the specifying information that is entered through the data entry screen and is sent from the client;

from a storing device storing a predetermined program including a main module, a plurality of sub-modules each corresponding to peripheral devices connected to the client and a plurality of sets of setting information making the predetermined program executable on the client, including client setting information regarding an operating environment of the client having at least one of an IP address, a user ID and a password and including designating information designating, from the plurality of sub-modules, the sub-module that is set to be executable on the client that is an origin of the specifying information by using a bit array of a predetermined number of bits each corresponding to the peripheral devices, reading out the main module, the sub-module designated by the bit positions of the designating information and the setting information specified by the specifying information received from the client; and sending these to the client that is the origin of the specifying information; and by the client, receiving the main module, the sub-module and the setting information that is specified by the specifying information that are sent from the server; and performing environment settings of the client itself to make the main module and the sub-module respectively received from the server executable based on the setting information received from the server and reflecting the client setting information included in the setting information received from the server in the environment settings of the client itself.

4. A program setting method according to claim 3, wherein:

the plurality of sets of setting information are stored while being made to correspond with client identification information for identifying a client, the method further comprising:

by the client, sending, as the specifying information, the client identification information for identifying its client; and by the server, reading out from the storing device the setting information corresponding to the client identification information received from the client, as setting information specified by the specifying information received from the client.

* * * * *

UNITED STATES PATENT AND TRADEMARK OFFICE
CERTIFICATE OF CORRECTION

PATENT NO.        : 7,447,750 B2
APPLICATION NO. : 10/101855
DATED             : November 4, 2008
INVENTOR(S)       : Ryuji Kurosawa et al.

Page 1 of 1

It is certified that error appears in the above-identified patent and that said Letters Patent is hereby corrected as shown below:

Title Page, Item [54] (Title), Line 2, after "CLIENT" insert --,--.

Column 1 (Title), Line 2, after "CLIENT" insert --,--.

Signed and Sealed this

Seventeenth Day of February, 2009

JOHN DOLL
*Acting Director of the United States Patent and Trademark Office*